(12) United States Patent
Radermacher et al.

(10) Patent No.: US 9,748,766 B2
(45) Date of Patent: Aug. 29, 2017

(54) METHOD AND APPARATUS FOR MULTIPLEXED POWER AND DATA SUPPLY VIA A TWO-WIRE DATA COMMUNICATION CABLE

(71) Applicant: PHILIPS LIGHTING HOLDING B.V., Eindhoven (NL)

(72) Inventors: Harald Josef Günther Radermacher, Aachen (DE); Matthias Wendt, Würselen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 325 days.

(21) Appl. No.: 14/424,581

(22) PCT Filed: Aug. 12, 2013

(86) PCT No.: PCT/IB2013/056576
§ 371 (c)(1),
(2) Date: Feb. 27, 2015

(87) PCT Pub. No.: WO2014/033575
PCT Pub. Date: Mar. 6, 2014

(65) Prior Publication Data
US 2015/0207317 A1    Jul. 23, 2015

Related U.S. Application Data

(60) Provisional application No. 61/694,286, filed on Aug. 29, 2012.

(51) Int. Cl.
*H02J 1/06* (2006.01)
*G06F 1/26* (2006.01)
(Continued)

(52) U.S. Cl.
CPC ............... *H02J 1/06* (2013.01); *G06F 1/266* (2013.01); *H04L 12/10* (2013.01); *H04L 12/40045* (2013.01); *H05B 37/0263* (2013.01)

(58) Field of Classification Search
CPC . H02J 1/06; G06F 1/266; H04L 12/10; H04L 12/40045; H05B 37/0263
(Continued)

(56) References Cited

U.S. PATENT DOCUMENTS

| 4,477,896 A | 10/1984 | Aker |
|---|---|---|
| 5,727,025 A | 3/1998 | Maryanka |

(Continued)

FOREIGN PATENT DOCUMENTS

| DE | 102006006140 A1 | 8/2007 |
|---|---|---|
| EP | 1292060 A2 | 3/2003 |

(Continued)

OTHER PUBLICATIONS

"VX-160COAX Local Powered PoE Extender over Coaxial Kit" www.versatek.com/vx-160coax-local-powered-poe-extender-over-coaxial-kit.

*Primary Examiner* — Hal Kaplan
(74) *Attorney, Agent, or Firm* — Akarsh P. Belagodu

(57) ABSTRACT

The present invention relates to a method and apparatus for controlling data transfer and power supply to at least one load device (61-64) connected to a two-wire data communication cable (70) in a bus-type structure. Power supply and data transfer are multiplexed via the two-wire data communication cable so that a standard coaxial cable can be used for shared power and data transport, enabling the operation of lighting applications or other applications in retail and office, based on cheap, flexible, preconfigured cables in a bus topology and using known chipsets.

14 Claims, 4 Drawing Sheets

(51) Int. Cl.
*H04L 12/40* (2006.01)
*H05B 37/02* (2006.01)
*H04L 12/10* (2006.01)

(58) Field of Classification Search
USPC .......................................................... 307/4
See application file for complete search history.

(56) References Cited

U.S. PATENT DOCUMENTS

| 6,097,761 A | 8/2000 | Buhring et al. |
| 6,643,566 B1 | 11/2003 | Lehr et al. |
| 2005/0220004 A1 | 10/2005 | Vollmer et al. |
| 2008/0197790 A1 | 8/2008 | Mangiaracina et al. |
| 2011/0112700 A1 | 5/2011 | Tajima |

FOREIGN PATENT DOCUMENTS

| EP | 2247026 A1 | 11/2010 |
| WO | 2011151773 A1 | 12/2011 |
| WO | 2012028981 A1 | 3/2012 |

METHOD AND APPARATUS FOR MULTIPLEXED POWER AND DATA SUPPLY VIA A TWO-WIRE DATA COMMUNICATION CABLE

CROSS-REFERENCE TO PRIOR APPLICATIONS

This application is the U.S. National Phase application under 35 U.S.C. §371 of International Application No. PCT/IB2013/056576, filed on Aug. 12, 2013, which claims the benefit of U.S. Provisional Patent Application No. 61/694,286, filed on Aug. 29, 2012. These applications are hereby incorporated by reference herein.

FIELD OF THE INVENTION

The invention relates to apparatuses for controlling power supply via a network connection (e.g. Ethernet connection). Furthermore, the invention relates to a supply device, a load device, and a system comprising the supply device, the load device and a data connection. The invention further relates to a corresponding method and a corresponding computer program.

BACKGROUND OF THE INVENTION

Ethernet is a family of computer networking technologies for local area networks (LANs). Ethernet was commercially introduced in 1980 and standardized in 1985 as IEEE 802.3 by the Institute of Electrical and Electronics Engineers (IEEE). Ethernet has largely replaced competing wired LAN technologies.

The Ethernet standards comprise several wiring and signaling variants of the Open Systems Interconnection (OSI) physical layer in use with Ethernet. The original 10BASE5 Ethernet used coaxial cable as a shared medium. Later the coaxial cables were replaced by twisted pair and fiber optic links in conjunction with hubs or switches.

The 10BASE-T Ethernet standard was designed for point-to-point links only, and all termination was built into the Ethernet device. Higher speed connections use initial auto-negotiation to negotiate about speed, half duplex and full duplex and master/slave. This auto-negotiation is based on pulses similar to those used by 10BASE-T devices to detect the presence of a connection to another device. When the auto-negotiation has finished, the devices only send an idle byte when there is no data send, to keep the link up.

Power-over-Ethernet (PoE) is an active standard (IEEE 802.3.af and IEEE 802.3.at) which allows a PoE supply to provide electrical energy to detached networked electrical consumers like routers, switches, printer spoolers, et cetera over their standard Ethernet cable connection. Here actual standardization is going to support power levels even above 50 W per Cat5 connection. Currently, discussions are coming up to use the same standard for all kinds of low power consumers like lighting equipment (sensors, switches, light sources) or entertainment appliances like active speakers, internet radios, Digital Versatile Disk (DVD) players, set-top boxes and even television (TV) sets. PoE phones and PoE powered control devices are becoming already common practice in offices.

In the industry, power distribution over network cables as covered by the PoE standard gets more and more used. Moreover, as a consequence of providing more and more LED based lighting systems, the request for efficient low cost driving architectures is high. One important application area can be lighting over Ethernet. PoE as covered in IEEE 802.3.af is based on a star network topology. However, in lighting applications, conductors with multiple loads are connected in parallel (like in track-lighting systems where spots are clamped on a track with conductor rails) or in daisy-chain where the cable from one luminaire clicks into the next and so forth. In both lighting topologies a shared medium for the network is matching the wiring schemes better. The old 10Base2 Ethernet standard was describing exactly that. But traditional PoE does only support twisted-pair wiring.

Conventional architectures use standard Cat5 Ethernet cabling, as the cables are cheaply available with preinstalled end connectors. Often the PoE standard is employed for power management. However the use of this standard does limit the solution to star topologies in wiring, as only one load can request power per port of a switch. Daisy-chaining is not easily possible as a powered device in the middle would need to offer to the next powered device a power supply unit (PSU) port that can provide power. On the other hand the device needs to indicate power requirements down/up the line to the PSU which inherently would require knowledge of the power requirements up/down the line.

FIG. 1 shows a conventional architecture of a PoE based lighting system with a central power supply device (e.g. power sourcing equipment (PSE)) 1 with a plurality of PoE enabled output ports 12. For each load device 2 one of the output ports 12 gets wired by Cat5/6 cables 3 with connectors. In the example of FIG. 1, the load device 2 is a PoE lamp that incorporates a light source 26 and a PD controller/driver 20. Other load devices could also comprise fans, sensors or user interface devices like displays or switch panels. The supply device 1 comprises a PSU controller 10 which controls for each individual output port 12 the applied voltage and monitors for over-current with respect to the power request signalled by the PD controller 20 in each load device. However, only star type wiring or topology or configuration is supported and hence an individual wiring between each and every load (lamp, sensor, . . . ) and the central PSE is required.

SUMMARY OF THE INVENTION

It is an object of the invention to provide a network connection for efficiently powering loads by using a two-wire data communication cable, such as—but not limited to—a coaxial (e.g. a Bayonet Neill-Concelman (BNC) cable).

This object is achieved by an apparatus as claimed in claim 1 and claim 2, by a supply device as claimed in claim 10, by a load device as claimed in claim 11, by a system as claimed in claim 12, by a method as claimed in claim 14, and by a computer program product as claimed in claim 15.

Accordingly, a two-wire data communication cable (e.g. a standard BNC-cable) can be used for shared or multiplexed power and data transport, enabling the operation of lighting applications in retail and office, based on cheap, flexible, preconfigured cables in a bus topology and using known chipsets. This allows for an implementation of (a kind of) PoE on a normal coaxial cable (e.g. RG58 or other BNC cable) or any other two-wire balanced or unbalanced medium.

According to a first aspect, a plurality of the load devices may be connected to the two-wire communication cable in a bus-type structure, wherein time division multiplexing can be applied to share the two-wire data communication cable for power and data transport. Thereby, the multiple load based system can easily be extended by connecting new loads to the bus-type structure without requiring new ports or wirings to the central PSU.

According to a second aspect which can be combined with the first aspect, the data transfer part of the apparatus of the load device may be adapted to transmit data by generating a current sink that pulls low a data signal on the two-wire data communication cable with a predetermined current to create a voltage drop across a termination unit of the two-wire data communication cable. This ensures that reliable data communication via the two-wire data communication cable can be achieved with low circuit complexity.

According to a third aspect which may be combined with the first or second aspects, the data transfer part of the apparatus of the load device may be adapted to receive data by detecting a voltage drop across a termination unit of the two-wire data communication cable and extracting data from a sequence of pull-down pulses on the two-wire data communication cable. Thus, also data reception can be achieved with little effort.

According to a fourth aspect which can be combined with any one of the first to third aspects, the termination unit may be adapted to limit a current flowing through the termination unit to a value sufficiently above a predetermined maximum termination current during data transmission but below a predetermined standby current during a powering phase. This enables clear separation between data transfer and power supply currents and at the same time keeps termination currents undistorted while in data transmission mode.

According to a fifth aspect which can be combined with any one of the first to fourth aspects, the data transfer part may be adapted to use Ethernet 10Base2 data arbitration to share the two-wire data communication cable during a data transport phase. The proposed solution can thus be implemented based on known standard procedures and commands.

According to a sixth aspect which can be combined with any one of the first to fifth aspects, the apparatus of the load device may further comprise a decoupling part adapted to decouple the data transfer part from the two-wire data communication cable during a powering phase. Thereby, malfunctioning can be prevented.

According to a seventh aspect which can be combined with any one of the first to sixth aspects, the load device(s) may comprise at least one of an Ethernet data driver and an Ethernet transceiver interface for the data transfer. This provides the advantage that existing Ethernet standards can be used for the proposed solution.

According to an eighth aspect which can be combined with any one of the first to seventh aspects, the predetermined polarity and amplitude of the powering voltage are chosen such that the application of the powering voltage is detected as a collision of data on the two-wire communication cable, and that a distortion of data communication, originating from the application of the powering voltage is handled by a collision detection and arbitration procedure of an applied data communication protocol. Thereby, available procedures can be used in an efficient manner to implement the proposed solution.

According to a ninth aspect which can be combined with any one of the first to eighth aspects the power supply device may be adapted to repeat application of the powering voltage in a predetermined sequence determined by the characteristics of power supply device, the two-wire data communication cable and the load device. Thereby, energy consumption and storing characteristics of the at least one load device can be designed such that recharging occurs before the voltage in an energy storage of the power supply storage part has fallen below a certain limit, wherein the limit is a predetermined limit or a dynamic limit communicated via at least one of the data transfer on the two wire communication cable, another data communication, and a starting or inhibition procedure of a recharging process, and wherein an actual voltage of the energy storage is communicated from the load device to the power supply device via at least one of the data transfer on the two wire communication cable, the other data communication and the starting or inhibition procedure of the recharging process, or is deteced or estimated by the power supply device. This ensures that the powering phase is only initiated if necessary at a load device.

It is noted that the above apparatuses of the supply device and the load device, rspectively, may be implemented as discrete hardware circuits or integrated circuits or multiple chips or chipsets, or as software routines for controlling a processor to perform their above functions or functionalities.

Further advantageous embodiments are defined below.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Embodiments are now described based on a system for multiplexed data transfer and power supply via a two-wire cable, such as a coaxial cable (e.g., a standard BNC cable). Optionally, Ethernet or PoE based procedures or signaling may be provided as well.

Figure 1:
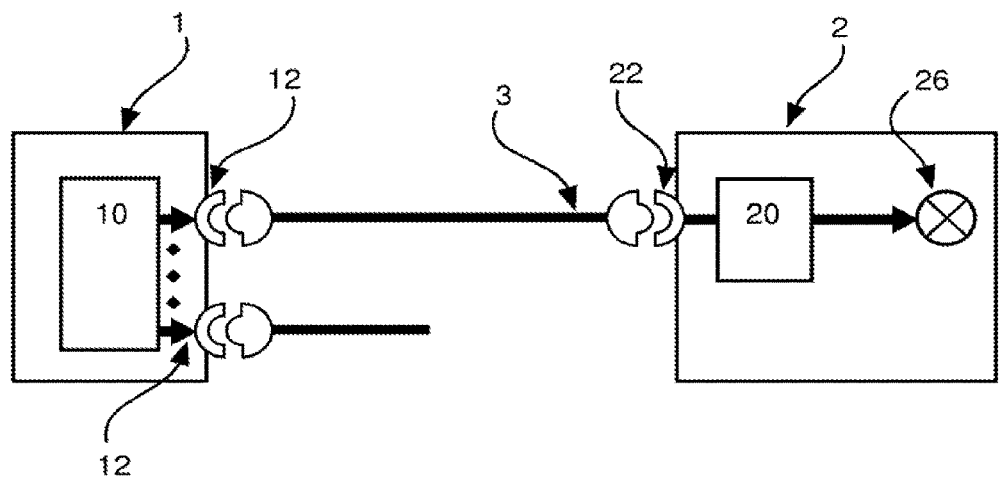
FIG. 1 shows a schematic block diagram of a conventional architecture of a PoE based lighting system.
Figure 2:
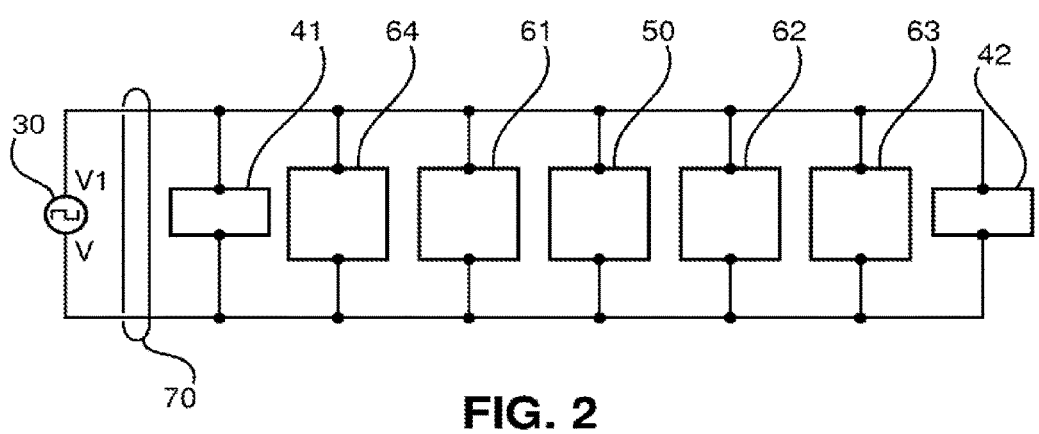
FIG. 2 shows a schematic block diagram of a system architecture with a bus-type structure according to a first embodiment.

FIG. 2 shows a schematic block diagram of a network system according to first embodiment. A number of loads or load devices 61 to 64 (e.g., two lamps 61, 62, a sensor 63 and another load 64) and a controller 50 are connected to a coaxial cable 70, wired in a bus structure, where time division multiplexing is applied to share the medium for power and data transport and known data arbitration methods of Ethernet 10Base2 may be used to share the medium for multiple communication streams during the data transport phase. At least on one end, the system is powered by a supply device 30 which generates a potential V1 at the upper wire of FIG. 2 and a potential V at the lower wire. Both ends of the two-wire cable are terminated by respective termination units 41, 42, which may comprise at least one resistor or other impedances or which may even comprise circuits with semiconductor devices. Within the cable length between the terminations 41, 42, the multiple loads 61 to 64 are connected to the two signals being the two wires of the coaxial cable 70. All devices share the same cable, both for power and for data communication. The benefit over the star structure described in FIG. 1 is that the total cable length is reduced, and that extension of the system is possible even without access to a central hub.

Although "any" two-wire cable with defined data propagation characteristics could be used, the embodiments may be focussed on a typical 10Base2 installation with 50Ω RG58 coaxial cable and BNC connectors. This cable and connenctor is widely used in industry, although usage for Ethernet has already declined due to increased usage of the faster twisted-pair medium. However, fast data speed is not a critical criterion for lighting or similar installations. As an example, the speed offered by the 10Base2 standard is sufficient.

It is noted that even the twisted pair cable could be used in the present embodiments. Twisted pair has an impedance of about 100Ω, so that with some adaptation of the physical protocol interface and the termination, this medium can transport the same data as described in the present embodiments. However, conductor thickness is less in twisted pair cables, compared to BNC cables. This would result in higher losses over the length of the cable, but is not a principle problem.

In the following, more detailed implementations of load devices of the proposed system according to second and third embodiments are described based on FIGS. 3 to 5.

FIG. 2 shows an exemplary two-lamp system with more detailed circuit diagrams of lamp devices 61, 62 according to a second embodiment. A pulsed power source VS applies a negative powering voltage via coupling diode DS to the bus-type structure of the coaxial cable 70 for a fraction of the time. Two termination resistors Ta and Tb are connected between the wires of the coaxial cable. Furthermore, the two lamp devices 61, 62 are connected between the two wires.

Each lamp device 61, 62 has a power storing and consuming part 613, 623 each comprising a respective capacitor C1, C2 and a load resistor RL1, RL2. In a real lamp device, there might be a string of light emitting diodes (LEDs) or a LED driver present in the power storing and consuming part 613, 623. Basically, powering of the load may be one reason for using such a system.

Moreover, a simplified circuit of a data transfer or transmission part 612, 622 of a 10Base2 physical layer protocol interface is depicted for each of the lamp devices 61, 61. Each of the data transmission parts 612, 622 comprises a voltage supply V1, V2 (e.g., 9V), where a positive output is connected or referenced to the shielding wire R of the coaxial cable 70 and a negative output is connected to an auxiliary line A1, A2. To transmit data, a respective current sink comprising a respective diode D_int_1, D_int_2, a respective resistor R_int_1, R_int_2 and a respective controlled switch SW1, SW2 pulls the data signal at bus wire B low with a certain current (e.g., 40 mA). This current will create a voltage drop across the termination resistors Ta, Tb (that, at the same time serve for terminating the coaxial cable 70 with it's characteristic impedance). The respective switch SW2 of the lower lamp device 62 is controlled by a data source D2. The voltage drop across the termination resistors Ta and Tb is noticed or detected by a data receiver part (not shown) which is connected to respective signal lines L1 and L2 of all other loads in the system. Data is extracted from the detected sequence of pull-down-pulses.

In contrast to a normal, non-PoE 10Base2-System, the bus power source VS provides a powering voltage outside the normal specification of the physical layer protocol on the bus wire B. To prevent malfunction, a respective additional decoupling block 611, 621 comprising a respective resistor R_ext_1, R_ext_2 may optionally be used. During non-powering intervals, the data are coupled from the respective transmitters to the bus wire B and to the respective receivers of the lamp devices 61, 62 via respective data transfer diodes DD1, DD2, while during powering intervals recharging of the respective power storing and consuming parts 613, 623 occurs via respective power supply diodes DP1, DP2 connected to respective supply lines S1, S2.

Figure 3:
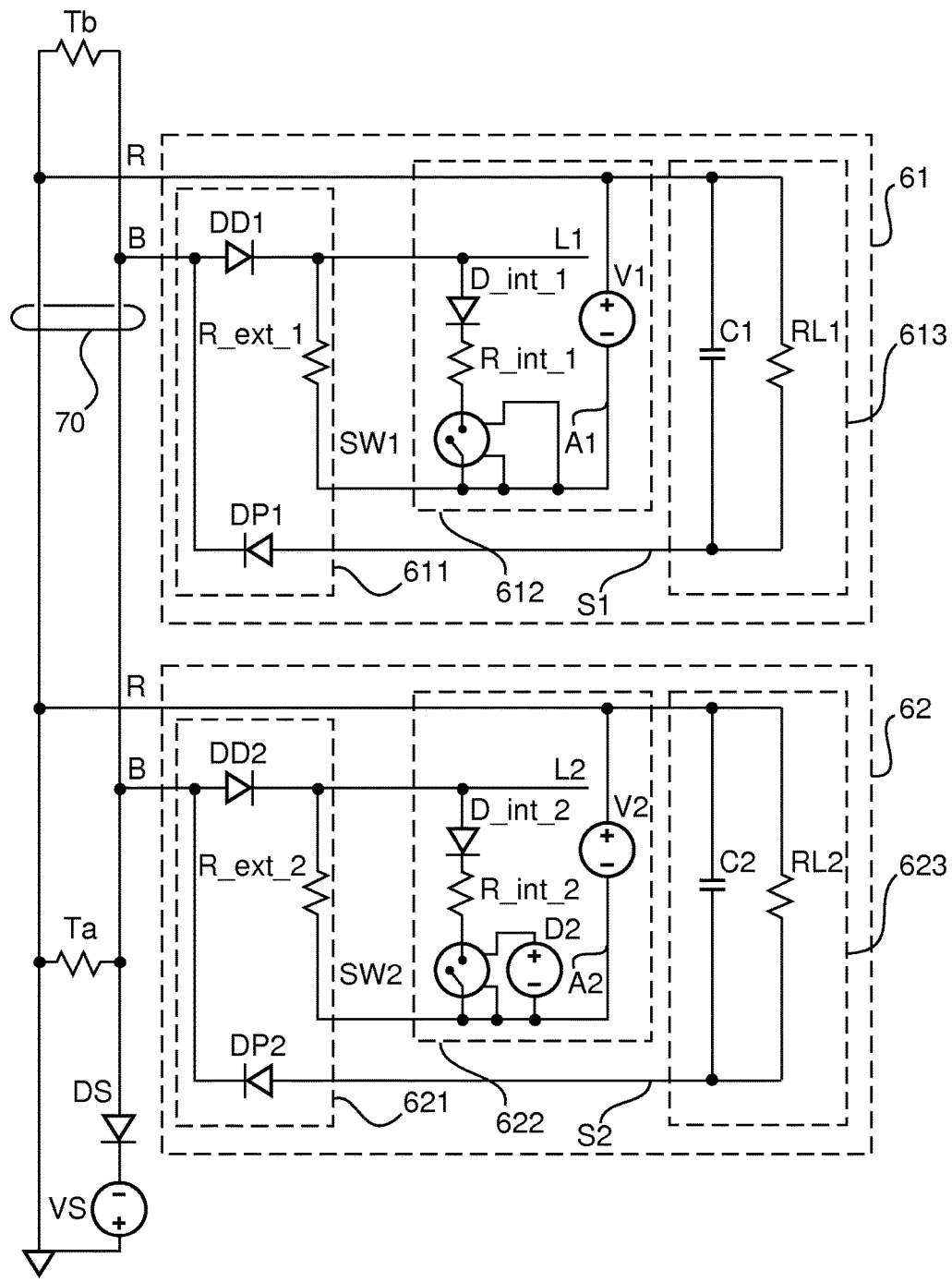
FIG. 3 shows a schematic circuit diagram of a system architecture with two load devices according to a second embodiment.
Figure 4:
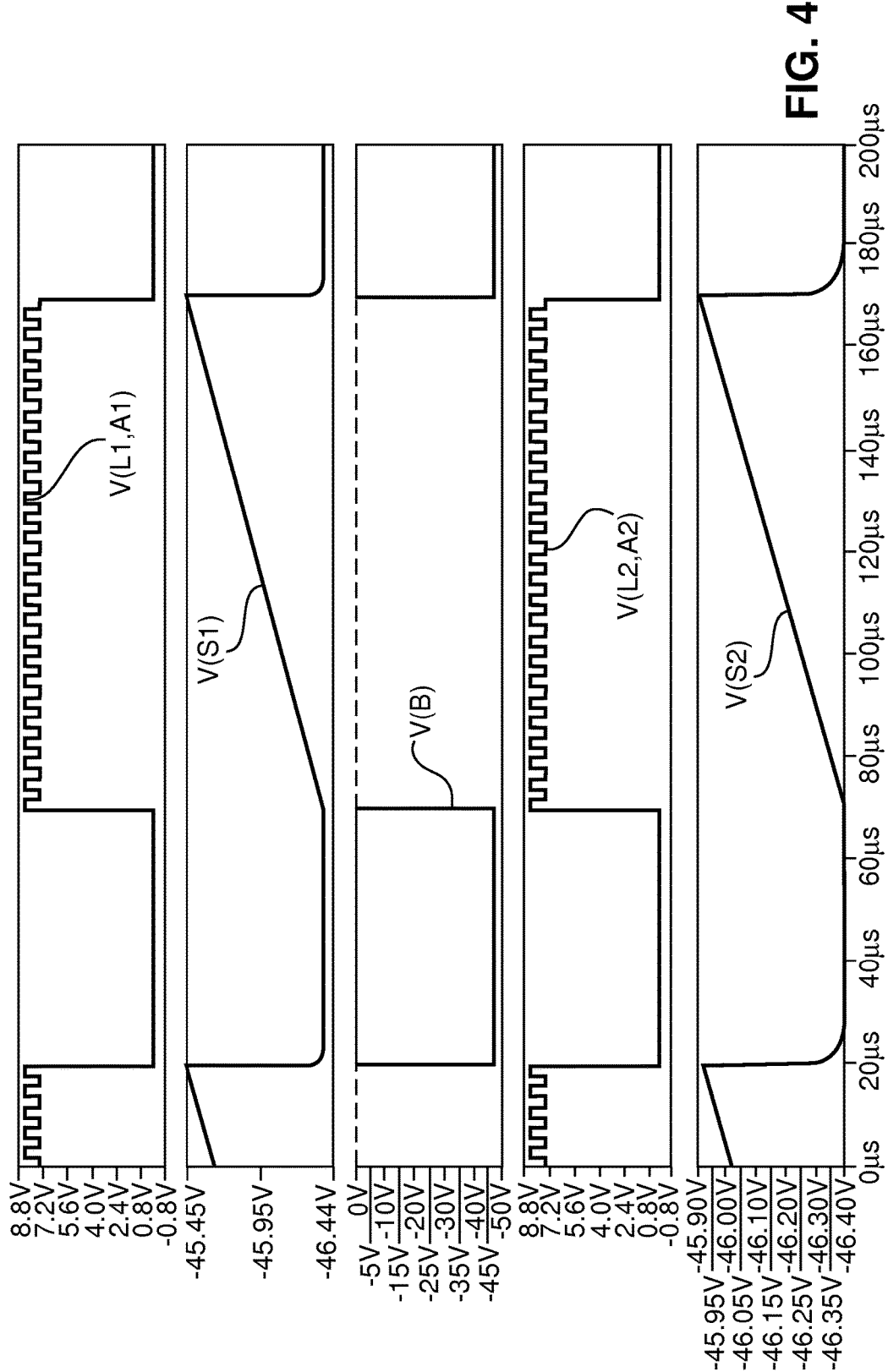
FIG. 4 shows waveform diagrams of characteristic signals in the load devices according to the second embodiment.

FIG. 4 shows time-dependent waveform patterns of characteristic signals of the circuits of FIG. 3. The top first waveform corresponds to the data signal V(L1, A1) as received on the line L1 of the first lamp device 61 which is in a receiving mode as indicated by the missing data source at the switch SW1. The next lower second waveform corresponds to the powering or power supply voltage V(S1) as present (and recharged) on line S1 of the first lamp device 61, and the third waveform V(B) corresponds to the voltage on the bus wire B. The next lower fourth waveform V(L2, A2) corresponds to the data signal as transmitted by the second lamp device 62 which is in a transmission mode as indicated by the data source D2. The bottom fifth waveform corresponds to the powering or power supply voltage V(S2) on line S2 of the second lamp device 62.

During the powering interval, a negative powering voltage is applied to the bus wire B and recharges the power receiving parts 613, 623 in all lamp devices 61, 62. Data signals are clamped towards values within the allowed range of the physical protocol layer specifications. During data transmission, data pass the decoupling means 611, 621 without problems, while all power storing and consuming parts 613, 623 stay decoupled.

Termination of the bus structure of the coaxial cable 70 is important for proper data communication. However, the traditional passive termination with a 50Ω resistor might create large standby losses. One example to reduced the losses would be to use a current limited termination provided in a third embodiment, as shown in FIG. 5.

Figure 5:
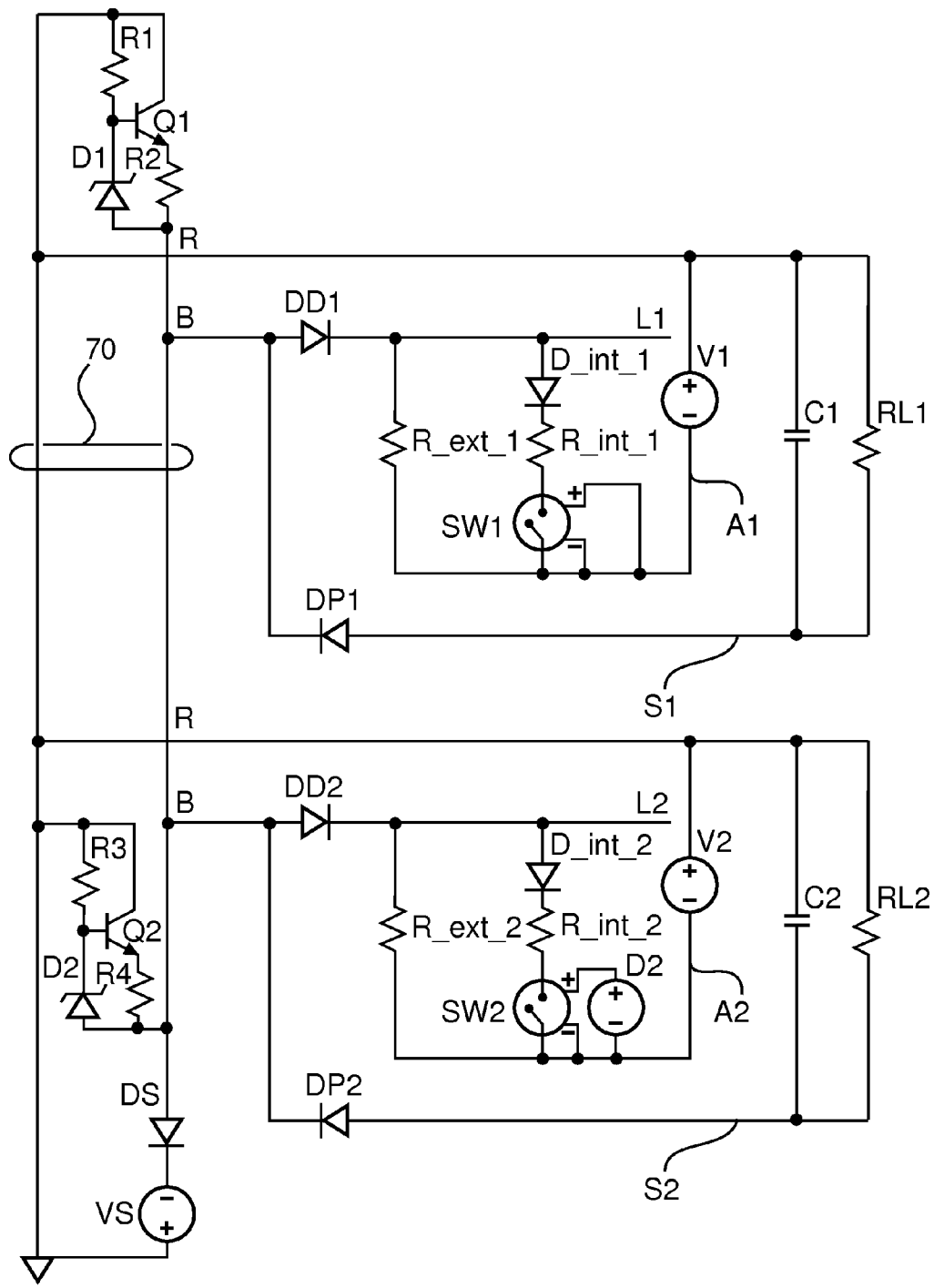
FIG. 5 shows a schematic circuit diagram of a system architecture with two load devices according to a third embodiment.

FIG. 5 shows a circuit digram according to the third embodiment similar to the second embodiment of FIG. 3 but with additional current limited terminations. The termination current is limited by current limiting circuit, comprising respective transistors Q1, Q2, respective resistors R1 to R4, and respective Zener diodes D1, D2, to a value (well) above the maximum termination current during data transmission, but (well) below the standby current during the powering interval. More specifically, during data transmission, the bus wire B is pulled low (e.g., towards −9V) by the current sink of the data transfer or transmission part 612, 622, as explained above in connection with FIG. 3, and the data transmission voltage corresponds to the voltage drop across the termination resistance Ta, Tb. During this data transmission, a maximum "data related" termination current will occur. This current should be provided by the active termination, as well. So, the designed limit of the current limiting circuit should be higher than the required maximum termination current during data transmission. However, the limit should be only a bit higher that this level, in order to avoid too much losses during the powering interval. As an alternative, the termination can be deactivated completely during powering to reduce losses. Other methods, e.g. capacitive coupling or deactivation outside the data transmission voltage window may be used as well.

In the above embodiments, at the power source VS, information about the timing of the powering signal is easily available. Here, a termination unit could be integrated with the power source VS such that no extra losses are generated by the termination during the powering phase. However, this would limit the position of the power source VS to one end of the two-wire cable, while otherwise the power source VS can be positioned at any place within the coaxial cable (e.g. in the middle, such that cable length and hence resistance and losses are minimized).

Furthermore, in the above embodiments, the predetermined polarity and amplitude of the powering voltage can be chosen such that the application of the powering voltage is detected as a collision of data on the coaxial cable, and that a distortion of data communication, originating from the application of the powering voltage is handled by a collision detection and arbitration procedure of the Ethernet protocol or another applied communication protocol.

As an additional option for the above embodiments, the power source 30 or VS may be adapted to repeat application of the powering voltage in a predetermined sequence determined by the characteristics of the power source VS, the coaxial cable 70 and the load device 61-64. Energy consumption and storing characteristics of the load devices 61-64 can be designed to ensure that recharging occurs or is initiated before the voltage in an energy storage (e.g. the respective capacitors C1 and C2 of the power storing and consuming part 613, 623 of FIG. 3 or 5) has fallen below a certain limit, wherein the limit is a predetermined limit or a dynamic limit which can be communicated via the data transfer on the coaxial cable 70. As an alternative or additional option, the limit could be communicated via another data communication and/or a starting or inhibition procedure of the recharging process (e.g., as controlled by the power storing and consuming part 613, 623 of FIG. 3 or 5). The actual voltage of the energy storage, which is to be compared with the predetermined or dynamic limit, can also be communicated from the load device 61-64 to the power supply device via at least one of the data transfer on the coaxial cable 70, the other data communication and the starting or inhibition procedure of the recharging process. Alternatively, the actual voltage can be detected or estimated by the power supply device VS.

In the above embodiments, bus arbitration, collision detection, protocol handling, etc. can be taken from the existing Ethernet standards. As an example, the data driver of the physical protocol layer may by designed similar to a thinwire 10Base-2 Ethernet typical driver. Then, the signals RXI and TXO can be connencted e.g. to the decoupling blocks or parts 611, 621 of FIG. 3. As an example, the block diagram of interfacing to 10Base2 as found in the datasheet of the data driver DP8392C could be implemented in the above embodiments. Furthermore, physical protocol layer interfacing according to the 10Base2 Ethernet standard as found in the datasheet of the data driver DP8392C could be implemented in the above embodiments. More specifically, interfacing of an Ethernet attachment unit interface (AUI) to an 10Base2 Ethernet data line may be implemented as described in the datasheet of the DP8392C-1 coaxial transceiver interface (CTI); Texas Instruments literature number: SNLS078A.

Furthermore, in an alternative software-based implementation, the required functionalities can be implemented in a computer device with a processing unit which performs control based on software routines of a control program stored in a memory. The control program may also be stored separately on a computer-readable medium. Program code instructions are fetched from the memory and are loaded to the control unit of the processing unit in order to perform the functions of the steps or stages described in connection with FIGS. 2 to 5, which may be implemented as the above mentioned software routines. The processing steps may be performed on the basis of input data and may generate output data. In the present multiplexed data transfer and power supply mechanism, the input data may correspond to predetermined bus signals or voltages, and the output data may correspond to the data signals or voltages applied to the bus structure.

Consequently, the functionalities of the above embodiments may be implemented as a computer program product comprising code means for generating each individual step of the proposed channel estimation when run on a computer device or data processor.

To summarize, a method and apparatus have been described for controlling data transfer and power supply to at least one load device connected to a two-wire data communication cable in a bus-type structure. Power supply and data transfer are multiplexed via the two-wire data communication cable so that a standard coaxial cable can be used for shared power and data transport, enabling the operation of lighting applications or other applications in retail and office, based on cheap, flexible, preconfigured cables in a bus topology and using known chipsets.

While the invention has been illustrated and described in detail in the drawings and foregoing description, such illustration and description are to be considered illustrative or exemplary and not restrictive; the invention is not limited to the disclosed embodiment. A proposed application of the present invention may be power distribution for lighting systems in many markets like office and retail, e.g., lamps and sensors installed in arbitrary distance and/or position, such that the flexibility of the simple, single on-cable connection can be utilized. Thereby, interoperability of lamps of different manufacturers can be achieved. As a non-limiting example, the proposed embodiments can be seen as an alternative to the PoE standard IEEE 802.3.af for lighting over Ethernet to reduce system complexity.

Other variations to the disclosed embodiment can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An apparatus for supplying power to at least one load device via a two-wire data communication cable, said apparatus being adapted to repeatedly apply a pulsed powering voltage of a predetermined polarity and amplitude for a fraction of time to said two-wire data communication cable, said predetermined amplitude being different from an amplitude of a voltage used for transferring data via said two-wire data communication cable, wherein said predetermined polarity and amplitude of said powering voltage are chosen such that the application of said powering voltage is detected as a collision of data on said two-wire communication cable, and that a distortion of data communication, originating from the application of said powering voltage is handled by a collision detection and arbitration procedure of an applied data communication protocol.

2. The apparatus according to claim 1, wherein said two-wire data communication cable is a coaxial cable.

3. The apparatus according to claim 1, wherein a plurality of said load devices are connected to said two-wire communication cable in a bus-type structure and wherein time division multiplexing is applied to share said two-wire data communication cable for power and data transport.

4. A power supply device connected to a two-wire data communication cable, said power supply device comprising an apparatus according to claim 1.

5. A system comprising:
   a. at least one power supply device comprising an apparatus as defined in claim 1;
   b. at least one load device comprising an apparatus; and
   c. a two-wire data communication cable for connecting said at least one power supply device and said at least one load device together in a bus-type structure, wherein at least one end of said two-wire communication cable is powered by said at least one power supply device and wherein at least one end of said two-wire communication cable are terminated by a predetermined termination element.

6. The system according to claim 5, wherein said power supply device is adapted to repeat application of said powering voltage in a predetermined sequence determined by the characteristics of said power supply device, said two-wire data communication cable and said load device.

7. An apparatus for controlling data transfer and power supply at a load device connected to a two-wire data communication cable, said apparatus comprising a power supply storage part adapted to be recharged when a powering voltage of a predetermined polarity and amplitude is applied to said two-wire data communication cable, and a data transfer part which is adapted to detect on said two-wire data communication cable a temporary drop of a voltage of an amplitude different from said predetermined amplitude in order to receive data, and which is further adapted to generate said temporary drop of said voltage of different amplitude in order to transmit data.

8. The apparatus according to claim 7, wherein said data transfer part is adapted to transmit data by generating a current sink that pulls low a data signal on said two-wire data communication cable with a predetermined current to create a voltage drop across a termination unit of said two-wire data communication cable, and wherein said data transfer part is adapted to receive data by detecting a voltage drop across a termination unit of said two-wire data communication cable and extracting data from a sequence of pull-down pulses on said two-wire data communication cable.

9. The apparatus according to claim 8, wherein said termination unit is adapted to limit a current flowing through said termination unit to a value above a predetermined maximum termination current during data transmission but below a predetermined standby current during a powering phase.

10. The apparatus according to claim 7, wherein said data transfer part is adapted to use Ethernet 10Base2 data arbitration to share said two-wire data communication cable during a data transport phase.

11. The apparatus according to claim 7, further comprising a decoupling part adapted to decouple said data transfer part from said two-wire data communication cable during a powering phase.

12. The apparatus according to claim 7, wherein said predetermined polarity and amplitude of said powering voltage are chosen such that the application of said powering voltage is detected as a collision of data on said two-wire communication cable, and that a distortion of data communication, originating from the application of said powering voltage is handled by a collision detection and arbitration procedure of an applied data communication protocol.

13. A load device connected to two-wire data communication cable, said load device comprising an apparatus according to claim 7.

14. A method of controlling data transfer and power supply to at least one load device, said method comprising:
   connecting said at least one load device to at least one power supply device via a two-wire data communication cable in a bus-type structure; and
   multiplexing power supply and data transfer via said two-wire data communication cable by applying a voltage of a predetermined polarity to said two-wire data communication cable in order to supply power, and generating at least one temporary drop of a voltage of a polarity opposite to said predetermined polarity in order to transfer data via said two-wire data communication cable.

* * * * *